United States Patent [19]
Nakajima

[11] Patent Number: 5,670,752
[45] Date of Patent: Sep. 23, 1997

[54] WEIGHING CONVEYOR

[75] Inventor: Masayoshi Nakajima, Shiga, Japan

[73] Assignee: Ishida Co., Ltd., Kyoto, Japan

[21] Appl. No.: 231,736

[22] Filed: Apr. 25, 1994

[30] Foreign Application Priority Data

Apr. 28, 1993 [JP] Japan .................................. 5-125480

[51] Int. Cl.⁶ .................................................. G01G 19/00
[52] U.S. Cl. ........................... 177/145; 177/119; 177/244; 177/253; 177/DIG. 9
[58] Field of Search ................... 177/119, 145, 177/DIG. 9, 244, 253

[56] References Cited

U.S. PATENT DOCUMENTS

| 4,260,034 | 4/1981 | Randolph, Jr. ............................ 177/211 |
| 4,440,249 | 4/1984 | Rosso ........................................ 177/145 |

FOREIGN PATENT DOCUMENTS

| 283 388 | 9/1988 | European Pat. Off. . |
| 439 787 | 8/1991 | European Pat. Off. . |
| 19 46 468 | 9/1969 | Germany . |

*Primary Examiner*—Michael L. Gellner
*Assistant Examiner*—Shih-yung Hsieh
*Attorney, Agent, or Firm*—Staas & Halsey

[57] ABSTRACT

In a weighing conveyor, a driving roller includes an inner cylinder and an outer cylinder. The outer cylinder is rotatably supported on the inner cylinder. An endless belt is laid over the outer cylinder. An electric motor and a load cell are built in the inner cylinder. The motor drives the outer cylinder through a reduction gear mechanism.

9 Claims, 8 Drawing Sheets

WEIGHING CONVEYOR

BACKGROUND OF THE INVENTION

1. Field of the Invention

The present invention relates to an improvement of a weighing conveyor employed, for instance, in a system for weighing and pricing commodities.

2. Description of the Related Art

For instance, a packing facility where commodities for supermarkets are packed, may use a weighing and pricing system which automatically and continuously performs an operation of weighing packed commodities, and an operation of printing prices on labels according to the weights of the commodities thus weighed and sticking them onto the commodities. The weighing and pricing system includes an uptake conveyor for introducing commodities, a commodity weighing conveyor, and a label sticking conveyor with a label sticking machine above, which are continuously arranged. The system operates as follows: When a commodity is on the weighing conveyor, its weight is measured, and the price of the commodity is calculated from the weight thus measured, a predetermined unit price, and the packing weight. The price thus calculated and the unit price are printed on a label. The label is stuck on the commodity when the latter is being moved on the label sticking conveyor.

The weighing conveyor in the weighing and pricing system has been proposed by Japanese Utility Model Unexamined Publication No. Sho 60-179933.

The weighing conveyor, as shown in FIG. 8, is composed of a weighing device 100 and a belt conveyor 101. The belt conveyor 101 is designed as follows: A driving roller 104 and a driven roller 105 are rotatably supported between a pair of side frames 103 and 103 which are coupled to each other through coupling members 102. An endless belt 106 is laid over the rollers 104 and 105. The driving roller 104 is rotated through an endless belt 108 by an electric motor 107 mounted on one of the side frames 103, so that the endless belt 106 is run in the direction of the arrow (a). A belt supporting board 109 is connected between the pair of side frames 103 and 103, to support the upper line of the endless belt 106. The side frames 103 and 103 are coupled to load inputting members 110 and 110 protruded from the weighing device 100 located below the belt conveyor 101, so that the weight of the belt conveyor 101 and the weight of a commodity on the belt convey 101 are applied to the weighing device 100.

In the above-described weighing conveyor, the belt conveyor, the weighing device, and the belt driving motor are provided separately, and the belt conveyor is located above the weighing device. Therefore, the weighing conveyor is unavoidably bulky as a whole, and the belt level is high. Hence, in forming a system including the weighing conveyor, the degree of freedom in designing the layout is limited.

SUMMARY OF THE INVENTION

Accordingly, an object of the present invention is to eliminate the above-described difficulties accompanying a conventional weighing conveyor. More specifically, an object of the present invention is to make a weighing conveyor compact in construction which is adapted to measure articles conveyed on it.

The foregoing object of the present invention has been achieved by the provision of a weighing conveyor which comprises conveying means for conveying an article under measurement, which includes a plurality of rollers, an endless belt laid over the rollers, and an electric motor for driving one of the rollers; and load detecting means to which the weight of the whole of the conveying means is applied; wherein at least one of the rollers is of double structure having an inner cylinder and an outer cylinder; the load detecting means is accommodated in the inner cylinder in such a manner that one end of the load detecting means is coupled to a stationary member outside the roller, and the other end to the inner cylinder; the electric motor is fixedly secured inside the inner cylinder; the outer cylinder is rotatably supported on the inner cylinder; rotation transmitting means for rotating the outer cylinder with the electric motor is provided between the inner cylinder and the outer cylinder; and a frame member provided between the roller of double structure and the remaining rollers is coupled to the inner cylinder.

The weighing conveyor thus constructed functions as follows:

The weighing conveyor of the present invention comprises the rollers, the endless belt laid over the rollers, and the motor for driving one of the rollers. Hence, when the motor is rotated, the rotation of the motor is transmitted through the rotation transmitting means to the roller, so that an article under measurement set on the endless belt is conveyed in the predetermined direction.

In the roller of double structure having the outer cylinder and the inner cylinder, the outer cylinder over which the endless belt is laid is supported on the inner cylinder, and the motor for driving the outer cylinder through the rotation transmitting means is supported in the inner cylinder. Furthermore, the frame members provided between the roller of double structure and the other roller are coupled to the inner cylinder and the inner cylinder is coupled to the load detecting means. Hence, in the case where only one load detecting means is employed, the weights of the components forming the article conveying means are collectively applied to the load detecting means. When, in this case, the article is on the upper line of the endless belt, the total weight including the weight of the article is applied to the load detecting means. In this case, the weights of the aforementioned components other than the article are constant, and therefore by subtracting the constant weights, as a packing weight, from the total weight, the weight of the article under measurement can be measured.

In the weighing conveyor of the present invention, the load detecting means is accommodated in the inner cylinder in such a manner that its one end is coupled to a stationary member outside the roller and the other end to the inner cylinder; that is, the load detecting means is built in the roller while the weight of the article conveying means is applied to the load detecting means. Furthermore, in the weighing conveyor, the electric motor is set inside the inner cylinder. Therefore, the weighing conveyor can be made low in the total hight and compact.

DETAILED DESCRIPTION OF THE PREFERRED EMBODIMENTS

Preferred embodiments of the present invention will be described with reference to the accompanying drawings.

Figure 1:
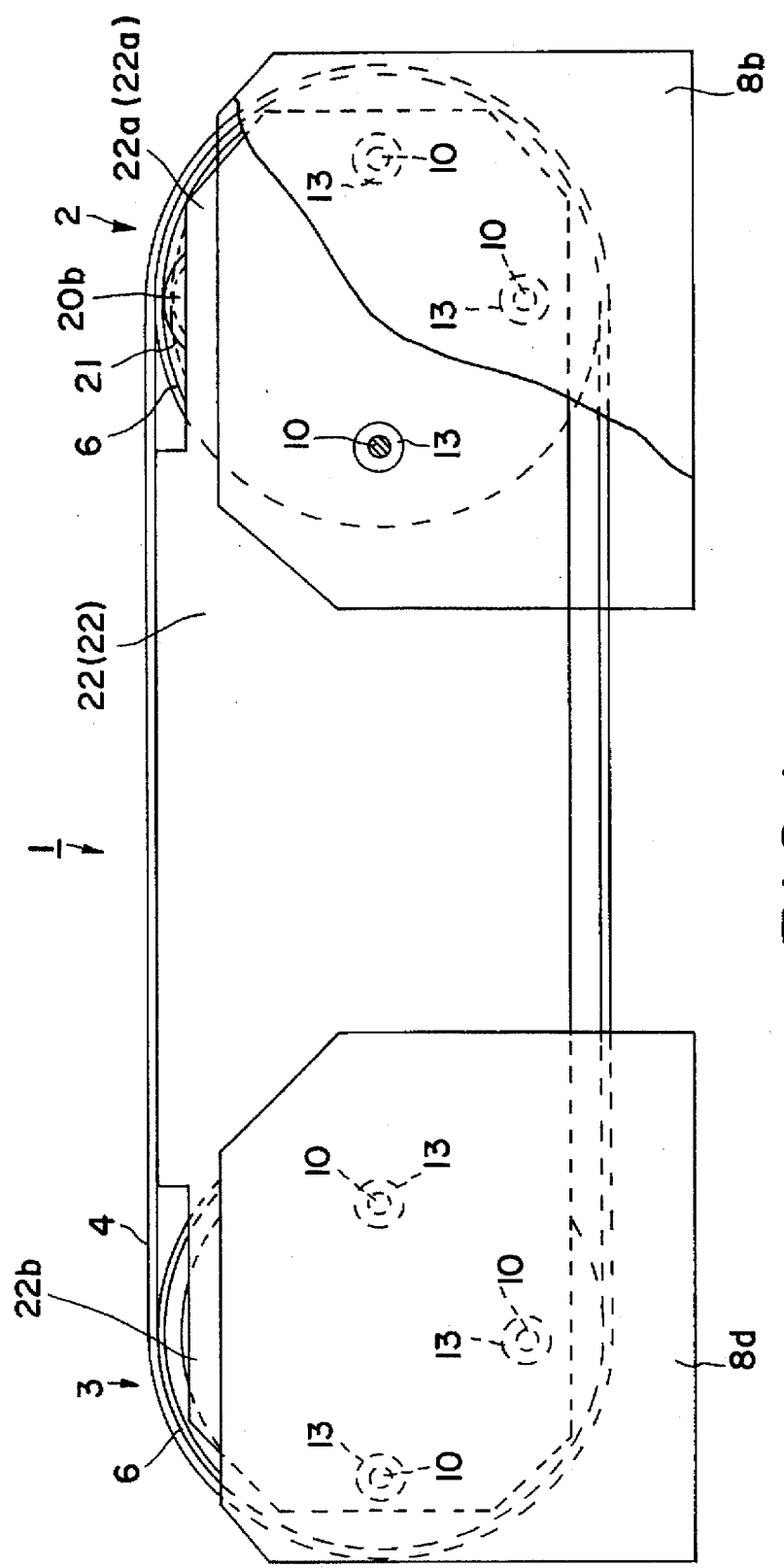
FIG. 1 is a side view of one example of a weighing conveyor, which constitutes a first embodiment of the present invention.

FIG. 1 shows a weighing conveyor 1, which constitutes a first embodiment of the present invention. The weighing conveyor 1 includes: a driving roller 2 and a driven roller 3 with their axes set in parallel with each other; and an endless belt 4 laid over the rollers 2 and 3.

Figure 2:
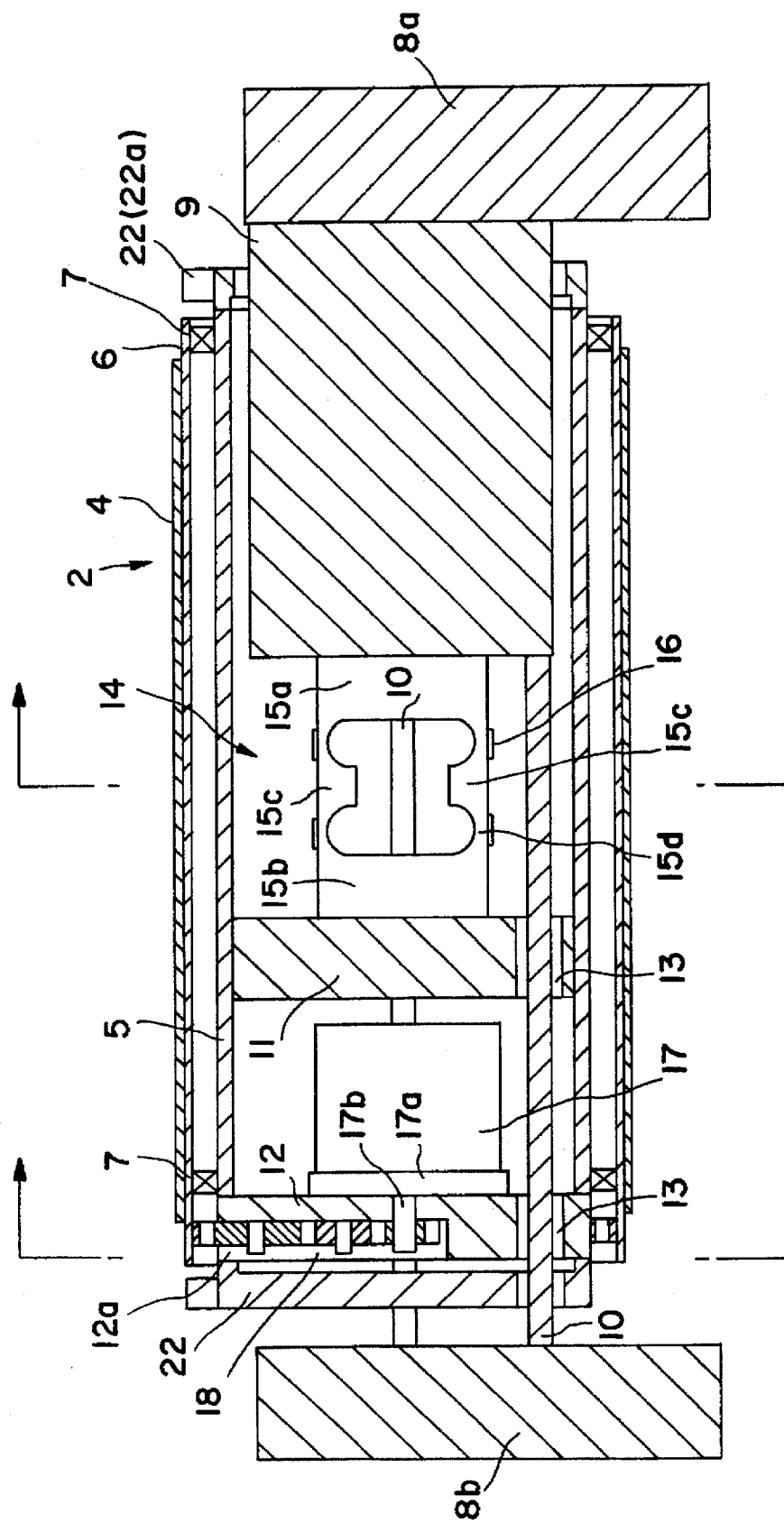
FIG. 2 is a sectional view of the weighing conveyor of the first embodiment, showing a driving roller.
Figure 3:
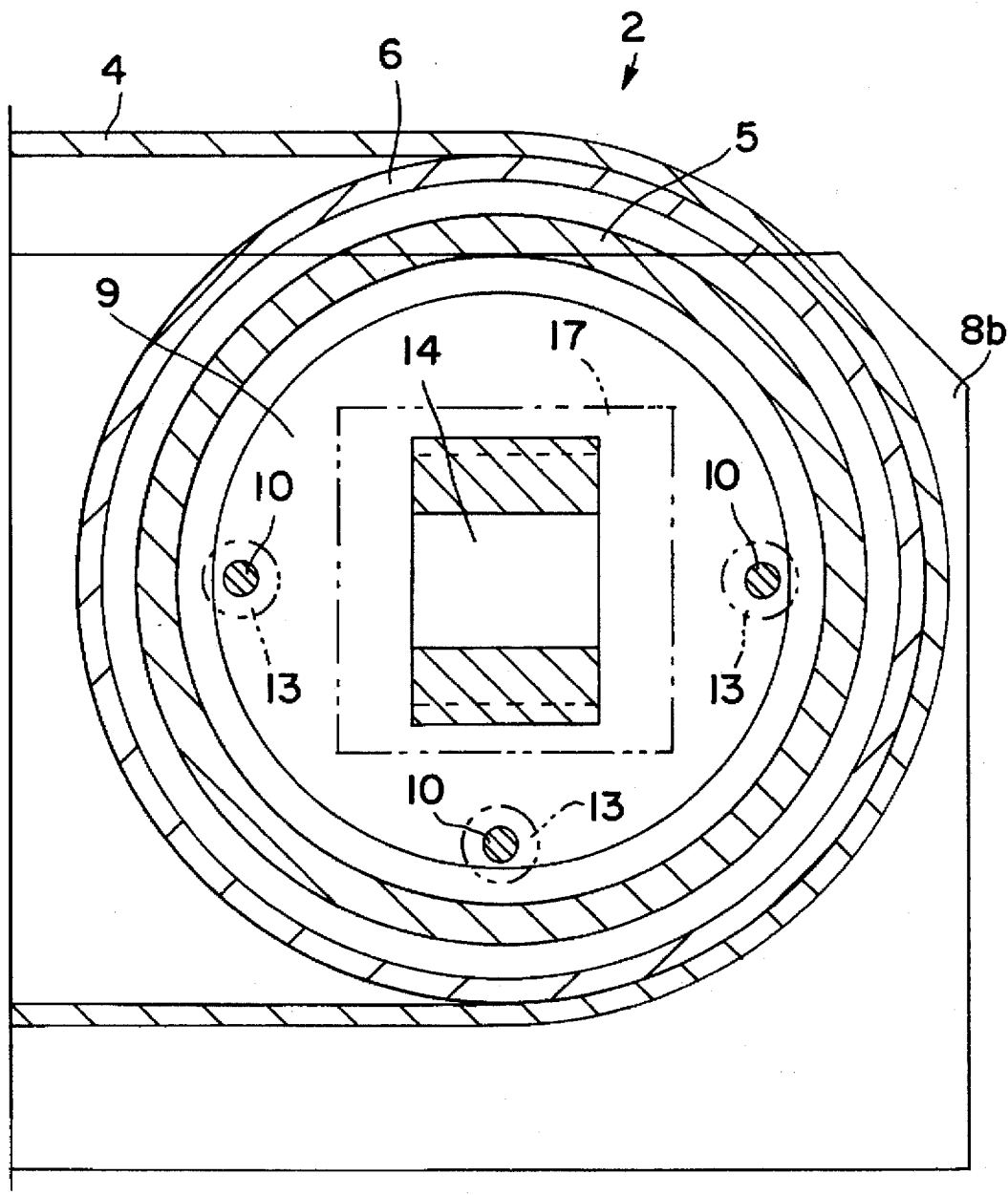
FIG. 3 is a sectional view taken along line A—A in FIG. 2, showing essential components of the weighing conveyor.

As shown in FIGS. 2 and 3, the driving roller 2 has an inner cylinder 5 and an outer cylinder 6 which are coaxial with each other. The outer cylinder 6 is rotatably supported through bearings 7 on the inner cylinder 5. The aforementioned endless belt 4 is laid over the outer cylinder 6. Supporting members 8a and 8b are provided near both ends of the outer cylinder 6. The supporting member 8a, located on the right side in FIG. 2, is coupled to an elongated member 9 which is extended into the inner cylinder 5. Three coupling members 10 are extended through the inside of the inner cylinder 5. One end of each of the coupling members is secured to the elongated member 9, and the other end is connected to the supporting member 8b on the left side.

An intermediate wall 11 is provided inside the inner cylinder 5 near at the middle, and an end wall 12 is provided at one end (the left end in FIG. 2). Three through-holes 13 larger in diameter than the coupling members 10 are formed in each of the walls 11 and 12, and the aforementioned coupling members 10 are inserted into the three through-holes 13 without interference, respectively. Load detecting means, namely, a load cell 14 is provided between the elongated member 9 and the intermediate wall 11. Thus, the inner cylinder 5 is supported through the intermediate wall 11 and the load cell 14 by the right and left supporting members 8a and 8b.

The structure of the load cell 14 will be described in brief.

The load cell 14 comprises a hollow-rectangular-parallelepiped-shaped strain generator 15; and a plurality of strain gauges 16. The strain generator 15 comprises a stationary solid portion 15a at one end; a movable solid portion 15b at the other end; and two beam portions 15c and 15c provided between the solid portions 15a and 15b in such a manner that they are parallel with each other. The strain gauges 16 are formed on the surfaces of strain generating portions 15d where the wall thickness of the beam portions 15c and 15c is smaller. The strain gauges 16 are to convert the strain of the surfaces into electrical signals. Hence, upon application of a load to the movable solid portion 15b, the strain generating portions 15d are strained, and the strain gauges 16 detect the amounts of strain of the strain generating portion, thereby to measure the load.

Figure 4:
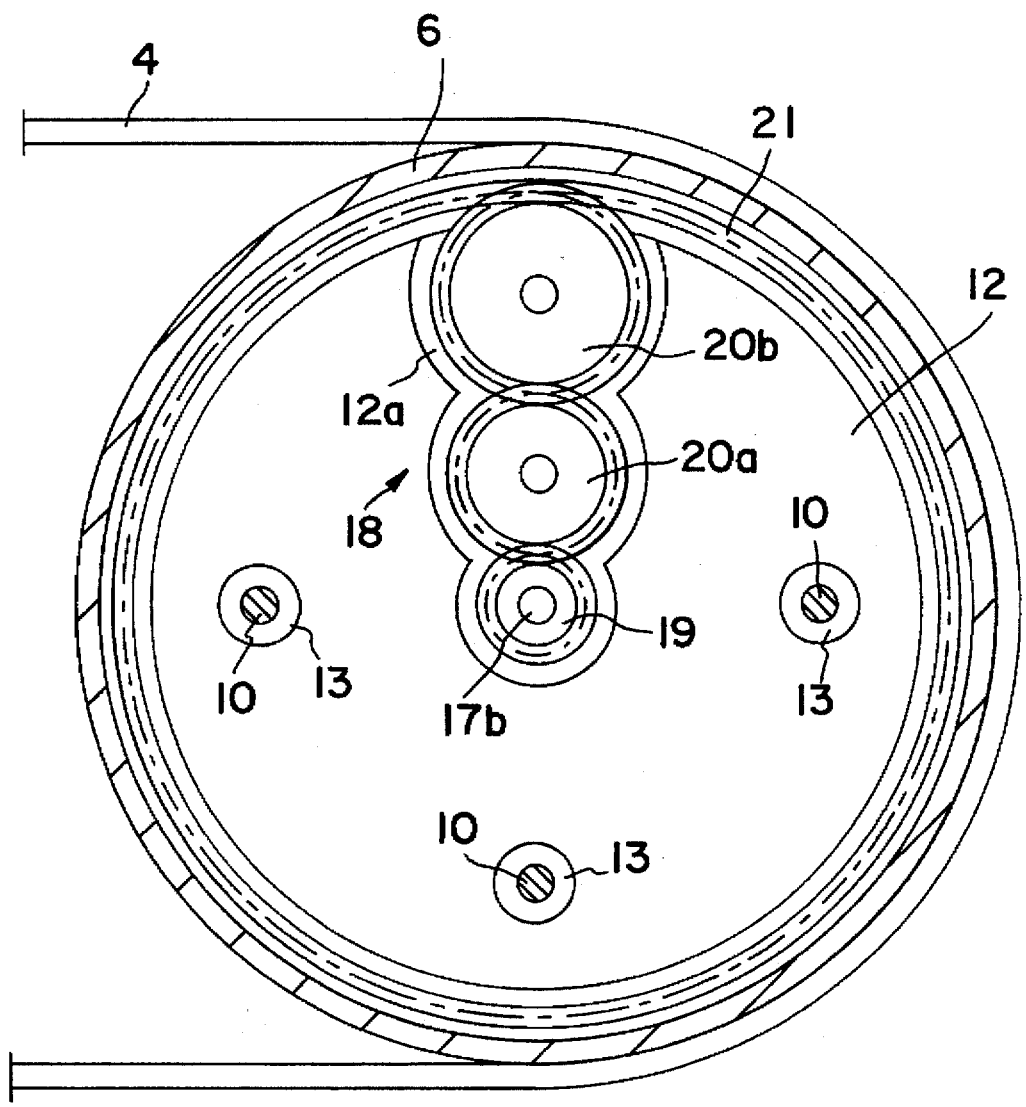
FIG. 4 is a sectional view taken along line B—B in FIG. 2, showing a gear mechanism.

On the other hand, an electric motor 17 for driving the outer cylinder 6 is provided between the intermediate wall 11 and the end wall 12 inside the inner cylinder 5. The base 17a of the motor 17 is secured to the surface of the end wall 12, which confronts the intermediate wall 11. The rotary shaft 17b of the motor 17 is extended through the end wall 12, and is coupled to the outer cylinder 6 through a reduction gear mechanism 18, which is provided in a recess 12a formed in the end wall 12. The reduction gear mechanism 18, as shown in FIG. 4 too, is made up of a small diameter drive gear 19 connected to the rotary shaft 17b of the motor, first and second intermediate gears 20a and 20b, and a large diameter ring gear 21 formed in the end portion of the inner surface of the outer cylinder 6. Hence, the rotation of the motor 17 is reduced in speed when transmitted from the drive gear 19 to the first intermediate gear 20a, and reduced again when transmitted from the first intermediate gear 20a to the second intermediate gear 20b, and further reduced when transmitted from the second intermediate gear 20b to the ring gear 21. Hence, the motor 17 may be small in size and small in capacity. Therefore, the motor 17 can be set compact inside the inner cylinder 5.

Figure 5:
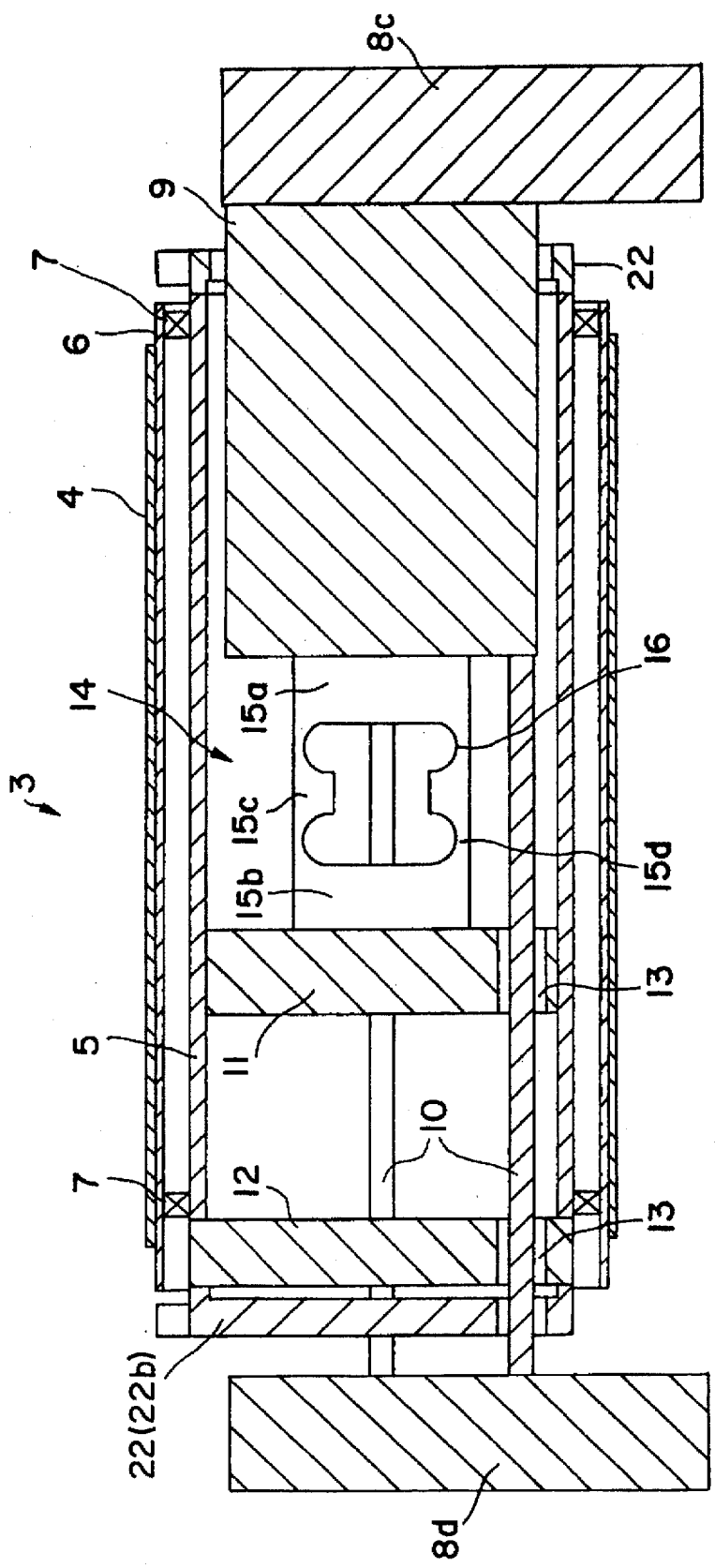
FIG. 5 is a sectional view of the weighing conveyor of the first embodiment, showing a driven roller.

In the embodiment, the driven roller 3 is similar in construction to the driving roller 2. That is, the driven roller 3, as shown in FIG. 5, comprises an inner cylinder 5 and an outer cylinder 6 which are arranged coaxial with each other. The outer cylinder 6 is rotatably supported through bearings 7 on the inner cylinder 5. The above-described endless belt 4 is laid over the outer cylinder 6. Similarly as in the case of the driving roller 2, supporting members 8c and 8d are provided near both ends of the driven roller 3. The supporting member 8c, located on the right side in FIG. 5, is coupled to an elongated member 9 which is extended into the inner cylinder 5. Three coupling members 10 are extended through the inside of the inner cylinder 5. One end of each of the coupling members is secured to the elongated member 9, and the other end is connected to the supporting member 8d on the left side.

Furthermore, an intermediate wall 11 is provided inside the inner cylinder 5 near the middle thereof, and an end wall 12 is provided at one end (the left end in FIG. 5). Three through-holes 13 larger in diameter than the coupling members 10 are formed in each of the walls 11 and 12, and the aforementioned coupling members 10 are inserted into the three through-holes 13 without interference, respectively. Load detecting means, namely, a load cell 14 is provided between the elongated member 9 and the intermediate wall 11. In those points, the driven roller 3 is similar to the above-described driving roller 2.

As shown in FIG. 2, first end portions 22a and 22a of a pair of side plates 22 and 22 are fixedly secured to both ends of the inner cylinder 5 of the driving roller 2. On the other hand, as shown in FIG. 5, the remaining end portions 22b and 22b of the side plates 22 and 22 are fixedly secured to both ends of the inner cylinder 5 of the driven roller 3. That is, the driving roller 2 and the driven roller 3 are coupled to each other through the side plates 22 and 22.

The first embodiment thus constructed operates as follows:

First, the motor 17 built in the inner cylinder 5 of the driving roller 2 is rotated. The rotation of the motor 17 is transmitted to the outer cylinder 6 of the driving roller 2, while being reduced in speed by the reduction gear mechanism 18. In this case, the outer cylinder 6 is rotatably supported through the bearings 7 on the inner cylinder 6 as was described before. Hence, the outer cylinder 6 is turned by the torque which is applied through the reduction gear mechanism 18 thereto. On the other hand, in the driven roller 3, the outer cylinder 6 is rotatably supported on the inner cylinder 5, and the endless belt 4 is laid over the driving roller 2 and the driven roller 3. Hence, as the outer cylinder 6 of the driving roller 2 turns, the endless belt 4 is driven, so that the article under measurement on the endless belt 4 is conveyed.

When an article under measurement is placed on the endless belt 4, the total weight including the weight of the article is applied, in a distribution manner, to the load cells 14 and 14 in the driving roller 2 and the driven roller 3. The weights of members other than an article under measurement are constant. Hence, by subtracting the constant weights from the sum of the weights detected by the load cells 14 and 14, the weight of the article is determined.

In the above-described first embodiment, the inner cylinders 5 and 5 of the driving roller 2 and the driven roller 3 are connected to each other through the side plates 22 and 22, so that the weight of the article on the belt 4 is applied, in a distribution manner, to the load cells 14 and 14 through the side plates 22 and 22 and the inner cylinders 5 and 5. Hence, the weight of the article can be measured with high accuracy.

The load cell 14 and the motor 17 are built in the inner cylinder 5 of the driving roller 2, and the load cell 14 is built in the inner cylinder 5 of the driven roller 3, which makes it possible to reduce the height of the resultant weighing conveyor 1 and to make the weighing conveyor compact in construction.

A second embodiment of the present invention will be described. In the following description, parts corresponding functionally to those which have been described with reference to the first embodiment are designated by the same reference numerals or characters.

Figure 6:
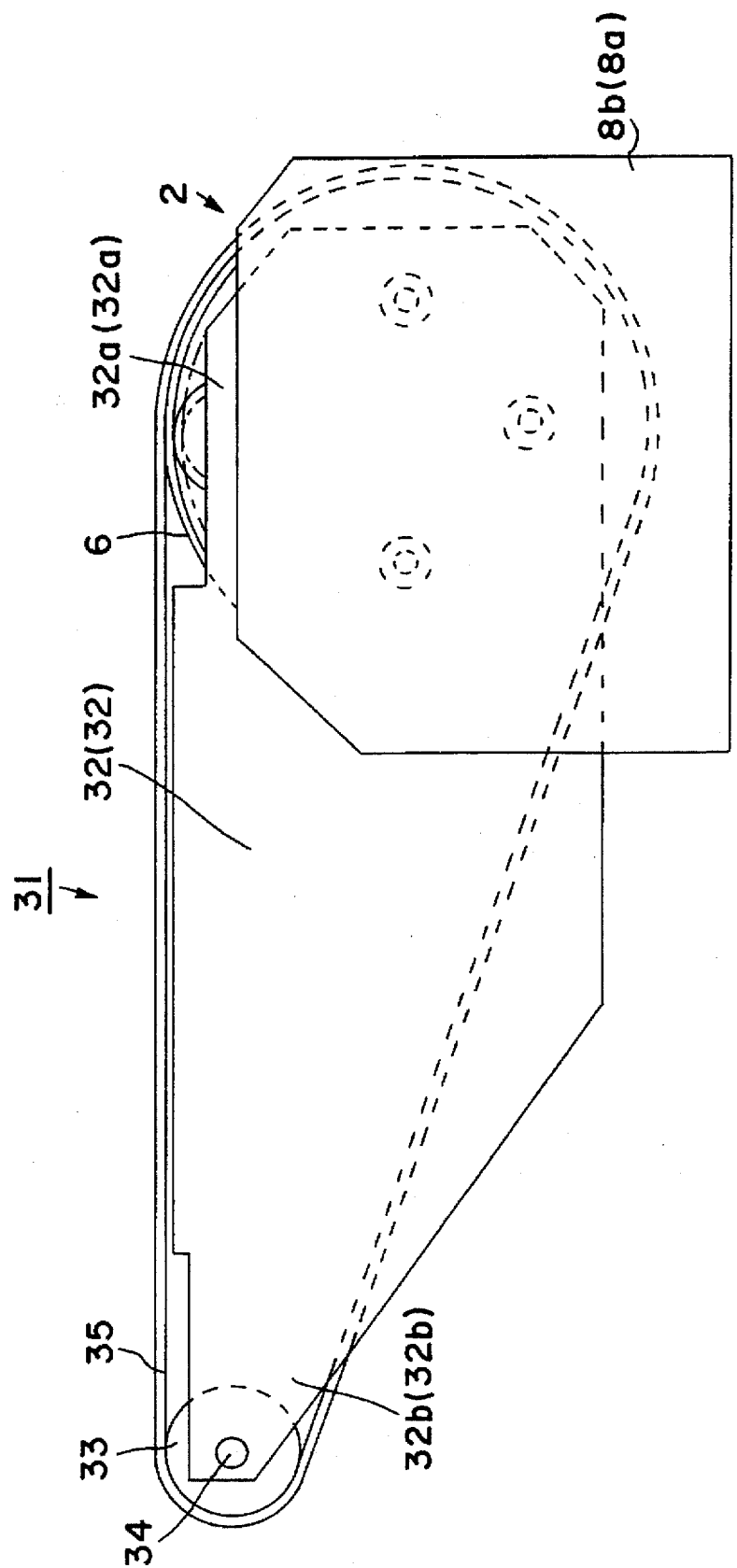
FIG. 6 is a side view of another example of the weighing conveyor, which constitutes a second embodiment of the present invention.

FIG. 6 shows a weighing conveyor 6, which constitutes the second embodiment of the present invention. In the weighing conveyor 6, a driving roller 2, which is similar in construction to the one in the above-described first embodiment, is supported by right and left supporting members 8a and 8b, and first end portions 32a and 32a of a pair of side plates 32 and 32 are secured to both ends of an inner cylinder (not shown) constituting the driving roller 2. A driven roller 33, which is a cylindrical roller smaller in diameter than the driving roller 2, is rotatably supported by a shaft 34 which is disposed between the remaining end portions 32b and 32b of the side plates 32 and 32. An endless belt 35 is laid over the driven roller 33 and an outer cylinder 6 constituting the driving roller 2.

The second embodiment thus constructed has the same effects as the above-described first embodiment. A load to the driven roller 33 is applied through the side plates 32 and 32 to the inner cylinder of the driving roller 2 in which a load cell (not shown) is built. Hence, the weight of an article under measurement on the belt 35 laid over the driven roller 33 and the driving roller 2 is collectively applied to the load cell. Thus, the weight of the article is measured with high accuracy.

Now, a third embodiment of the present invention will be described.

Figure 7:
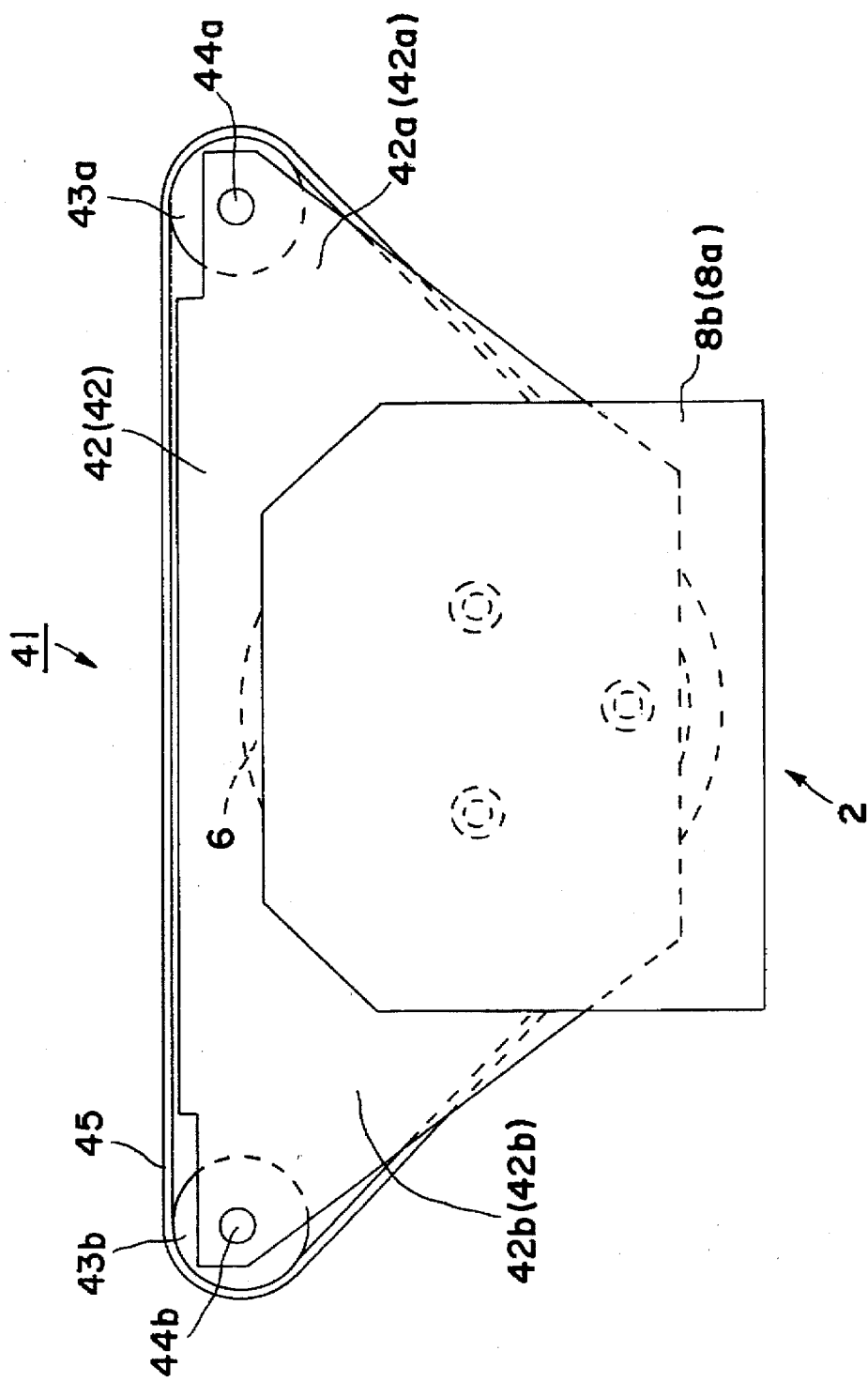
FIG. 7 is a side view of another example of the weighing conveyor, which constitutes a third embodiment of the present invention.
Figure 8:
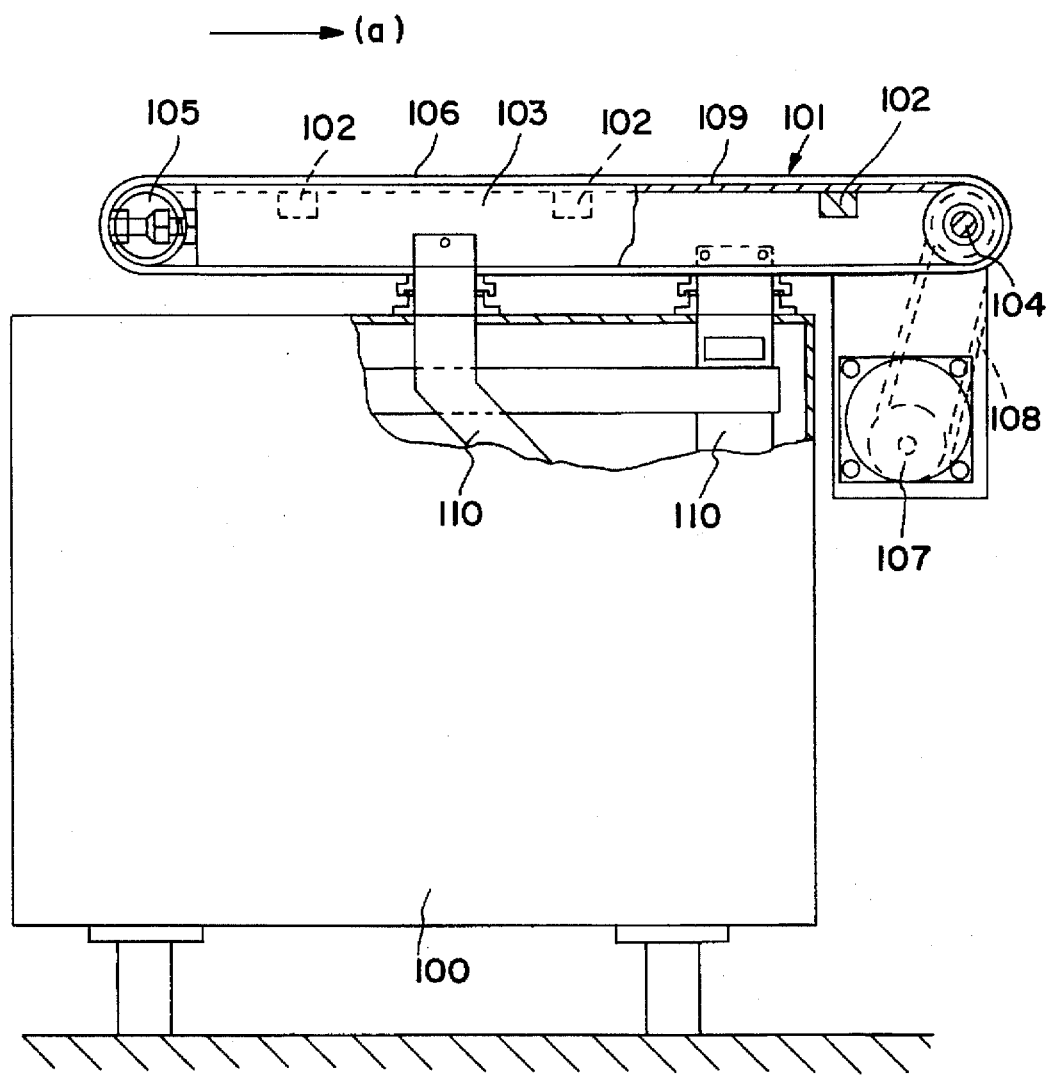
FIG. 8 is a side view, with parts cut away, showing a conventional weighing conveyor.

FIG. 7 shows a weighing conveyor 41, which constitutes the third embodiment of the present invention. In the weighing conveyor 41, a driving roller 2, which is similar in construction to the one in the above-described first embodiment, is supported by right and left supporting members 8a and 8b, and the central portions of a pair of inverted-trapezoid-shaped side plates 42 and 42 are secured to both ends of an inner cylinder (not shown) of the driving roller 2. A first driven roller 43a, which is a cylindrical roller smaller in diameter than the driving roller 2, is rotatably mounted on a shaft 44a which is disposed between first end portions 42a and 42a of the upper edge portions of the side plates 42 and 42. Similarly, a second driven roller 43b, which is also a cylindrical roller smaller in diameter, is rotatably mounted on a shaft 44b which is disposed between the remaining end portions 42b and 42b of the upper edge of the side plates 42 and 42. That is, the first and second driven rollers 43a and 43b are arranged symmetrically with respect to the driving roller 2. An endless belt 45 is laid over the first and second driven rollers 43a and 43b and an outer cylinder constituting the driving roller 2.

The third embodiment thus constructed has the same effects as the first embodiment. In addition, the load acting on the first and second driven rollers 43a and 43b is applied through the side plates 42 and 42 to the inner cylinder of the driving roller 2 incorporating a load cell (not shown). That is, the weight of an article under measurement, which is set on the endless belt 45 laid over the first and second driven rollers 43a and 43b and the driving roller 2, is collectively applied to the load cell. Hence, the weight of the article is measured with high accuracy. In the third embodiment, the first and second driven rollers 43a and 43b are arranged symmetrically with respect to the driving roller 2, and therefore the whole system including the side plates 42 and 42 is symmetrical with respect to the driving roller, and the load applied to the load cell is substantially uniform in the right and left directions. Hence, the force substantially applied to the load cell is only a downward load, and the load cell is scarcely twisted in the right and left direction.

In the above-described embodiments, the load cell and the motor are built in one of the rollers. However, they may be so modified that the load cell is built in one of the rollers, and the motor is built in the other roller. Furthermore, in the above-described embodiments, the roller is cantilevered through the load cell. However, they may be so modified that a pair of load cells are set in the roller in such a manner that their fixing end portions are protruded from both ends of the roller, so that the entire of the roller is supported by the pair of load cells.

As was described above, according to the present invention, a weighing conveyor comprises conveying means for conveying an article under measurement, which includes a plurality of rollers, an endless belt laid over the rollers, and an electric motor for driving one of the rollers; and load detecting means to which the load of the whole of the conveying means is applied; in which at least one of the rollers is of double structure, being made up of the inner cylinder and the outer cylinder; and the load detecting means is accommodated in the inner cylinder in such a manner that its one end is coupled to a stationary member outside the roller and the other end is coupled to the inner cylinder; that is, the load detecting means is built in the roller while the weight of the conveying means is applied to the load detecting means. Furthermore, in the weighing conveyor, the electric motor is fixedly secured inside the inner cylinder. Therefore, the resultant weighing conveyor can be made low in the total hight and compact. Hence, in forming a system by combining the weighing conveyor with other devices, its layout can be designed with higher degrees of freedom.

What is claimed is:

1. A weighing conveyor, comprising:
   conveying means for conveying an article under measurement, said conveying means including a plurality of rollers, an endless belt laid over said rollers, and an electric motor for driving one of said rollers; and
   load detecting means for detecting a weight of said conveying means; wherein
   at least one of said rollers is of double structure having an inner cylinder and an outer cylinder;
   said load detecting means is accommodated in said inner cylinder in such a manner that one end of said load detecting means is coupled to a stationary member outside said one roller and the other end is coupled to said inner cylinder;

said electric motor is fixedly secured inside said inner cylinder;

said outer cylinder is rotatable supported on said inner cylinder;

said weighing conveyor further comprising:

rotation transmitting means for rotating said outer cylinder with said electric motor and provided between said inner cylinder and said outer cylinder; and a frame member provided between said roller of double structure and the remaining rollers is coupled to said inner cylinder.

2. A weighing conveyor, comprising:

conveying means for conveying an article under measurement, said conveying means including a plurality of rollers, an endless belt laid over said rollers, and an electric motor for driving one of said rollers;

load detecting means for detecting a weight of said conveying means; wherein at least one of said rollers is of double structure having an inner cylinder and an outer cylinder;

said load detecting means is accommodated in said inner cylinder in such a manner that one end of said load detecting means is coupled to a stationary member outside said one roller and the other end is coupled to said inner cylinder;

said outer cylinder is rotatably supported on said inner cylinder; and a frame member provided between said roller of double structure and the remaining rollers and coupled to said inner cylinder.

3. A weighing conveyor, comprising:

a driving roller having a first inner cylinder and a first outer cylinder, said first outer cylinder being rotatably supported on said first inner cylinder;

a first driven roller;

an endless belt laid over said driving roller and said first driven roller, an article under measurement being conveyed by said endless belt;

an electric motor for driving said driving roller, said electric motor being provided in said first inner cylinder;

first load detecting means for detecting a weight of said article;

rotation transmitting means for rotating said first outer cylinder with said electric motor, said rotation transmitting means being provided between said first inner cylinder and said first outer cylinder; and a pair of frame members provided between said driving roller and said first driven roller, said frame members being coupled to said first inner cylinder.

4. A weighing conveyor as claimed in claim 3, wherein said first driven roller has a second inner cylinder and a second outer cylinder, said second outer cylinder being rotatably supported on said second inner cylinder.

5. A weighing conveyor as claimed in claim 4, wherein said first load detecting means is accommodated in said first inner cylinder in such a manner that one end of said load detecting means is coupled to a stationary member outside said driving roller and the other end is coupled to said first inner cylinder.

6. A weighing conveyor as claimed in claim 4, wherein said first load detecting means is accommodated in said second inner cylinder in such a manner that one end of said load detecting means is coupled to a stationary member outside said first driven roller and the other end is coupled to said second inner cylinder.

7. A weighing conveyor as claimed in claim 5, further comprising second load detecting means for detecting a weight of said article, said second load detecting means being accommodated in said second inner cylinder in such a manner that one end of said second load detecting means is coupled to a stationary member outside said first driven roller and the other end is coupled to said second inner cylinder.

8. A weighing conveyor as claimed in claim 3, wherein said first load detecting means is accommodated in said first inner cylinder in such a manner that one end of said load detecting means is coupled to a stationary member outside said driving roller and the other end is coupled to said first inner cylinder, and wherein said first driven roller is smaller in diameter than said driving roller.

9. A weighing conveyor as claimed in claim 3, further comprising a second driven roller, wherein said first load detecting means is accommodated in said first inner cylinder in such a manner that one end of said load detecting means is coupled to a stationary member outside said driving roller and the other end is coupled to said first inner cylinder, wherein said endless belt is laid over said driving roller, said first driven roller and said second driven roller, and wherein said first and second driven rollers are smaller in diameter than said driving roller, and are provided above said driving roller and symmetrically with respect to said driving roller.

* * * * *